May 15, 1923.
R. T. DAILEY
DUMP WAGON
Filed July 12, 1921
1,455,714
2 Sheets-Sheet 2
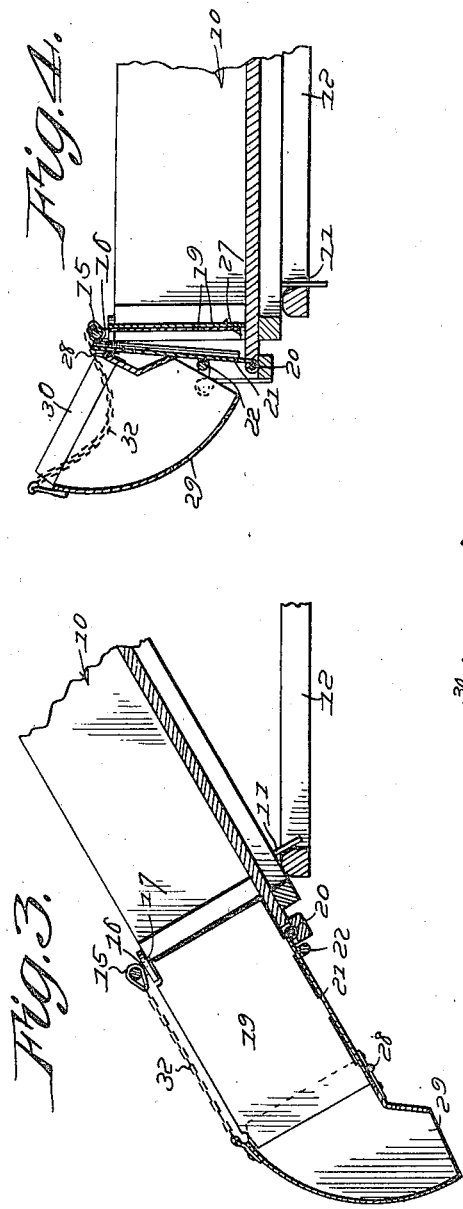
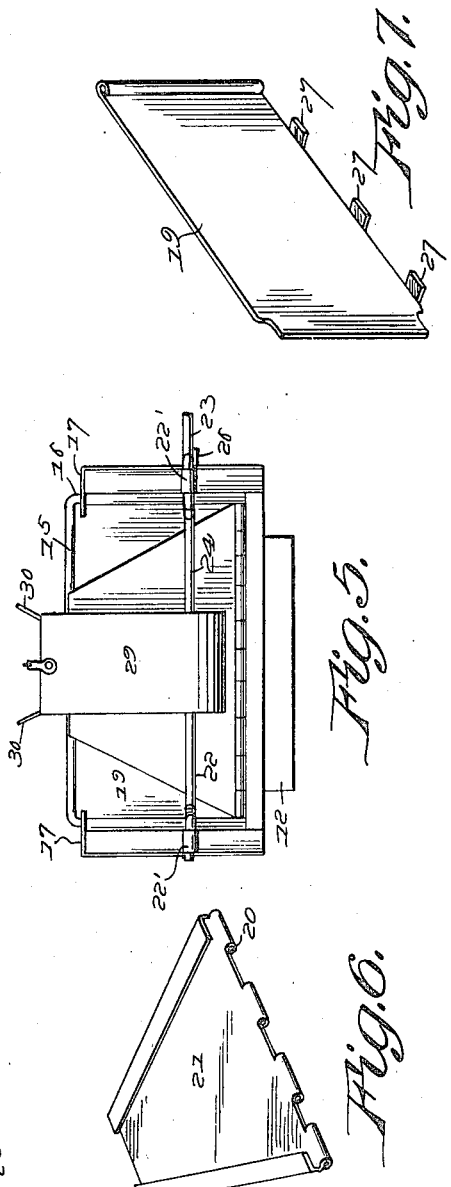
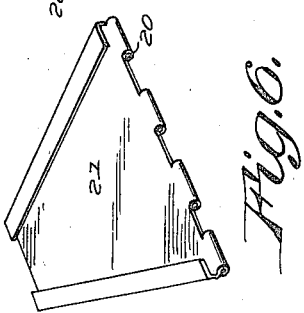
Inventor
R. T. Dailey,
By
G. Mune Talbert
Attorney Patented May 15, 1923.

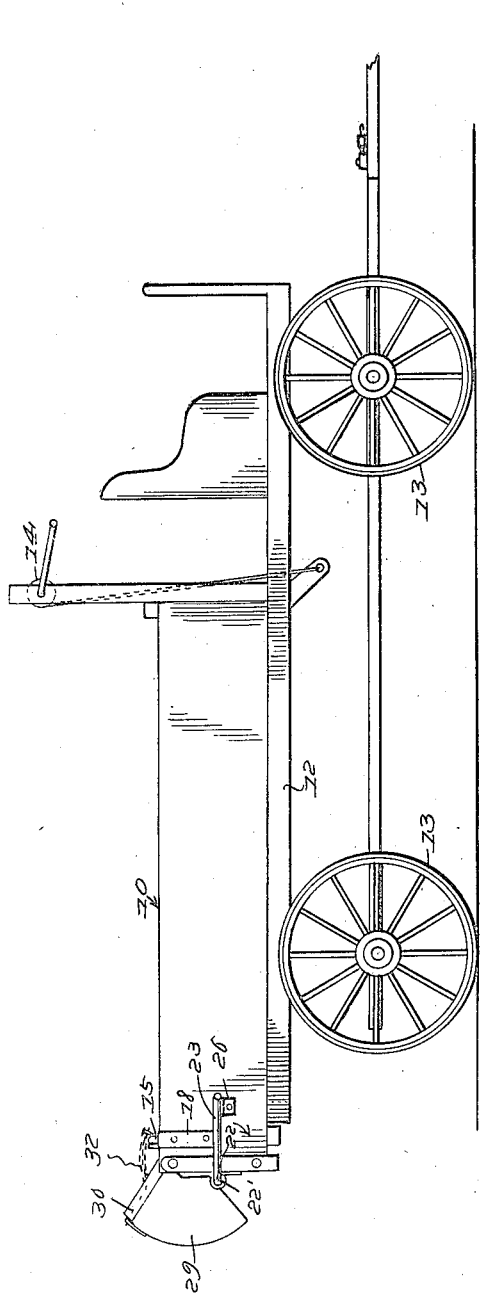
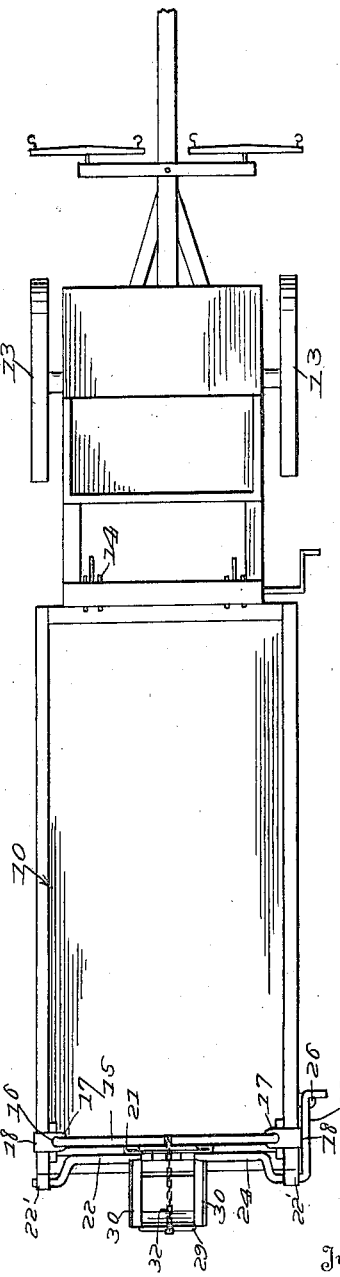

1,455,714

UNITED STATES PATENT OFFICE.

ROBERT T. DAILEY, OF OMAHA, NEBRASKA.

DUMP WAGON.

Application filed July 12, 1921. Serial No. 484,029.

*To all whom it may concern:*

Be it known that ROBERT T. DAILEY, a citizen of the United States of America, residing at Omaha, in the county of Douglas and State of Nebraska, has invented new and useful Improvements in Dump Wagons, of which the following is a specification.

The object of the invention is to provide a simple and efficient construction of dump wagon adapted for use in conveying coal, grain and like materials transported in bulk and also as a means of transporting dirt in connection with excavating operations and the like; and more particularly to provide in connection with a dump wagon a combined and vertical end gate and chute or delivery spout by which the contents of the body may readily be discharged and directed in delivery within predetermined and confined limits to avoid the scattering ordinarily incidental to such operations; and with these objects in view the invention consists in a construction and combination of parts of which a preferred embodiment is shown in the accompanying drawings, wherein :—

Figure 1 is a side view of a wagon embodying the invention.

Figure 2 is a plan view of the same.

Figure 3 is a longitudinal section of the rear end of the wagon showing the parts in the dumping position.

Figure 4 is a similar view showing the parts in the normal or closed position.

Figure 5 is a rear view.

Figure 6 is a detail perspective view showing the chute plate.

Figure 7 is a similar view of one of the gate members.

The wagon body 10 may be of any desired or preferred construction and dimensions adapted for the particular purpose for which it is designed and hingedly mounted for tilting movement near its rear end, as indicated at 11 upon the truck frame 12 having the usual supporting wheels 13 and operating or elevating means 14 whereby the front end of the body may be elevated to dispose the same in an inclined or dumping position as indicated in Figure 3.

Transversely connecting the side walls of the body near its rear end is a rod 15 having depending terminal arms 16 engaging eyes 17 formed at the inner ends of clips 18 secured to said side walls, and hingedly mounted upon said depending arms of the cross bar are the gate members 19 which when folded into closed or parallel relations as indicated in Figure 4 are overlapped at their inner ends while hingedly mounted as at 20 for arrangement flush with the upper surface of the bottom of the body is a chute plate 21 tapered in width toward its rear or free end and adapted to be supported in the horizontal plane of the body of vehicle by means of a crank bar 22 mounted in bearings 22' on the rear ends of the sides of the body and provided with a crank arm 23. When the loop 24 of the crank bar or shaft is in the pendent position indicated in Figure 3 it serves as a means for limiting the downward swinging movement of the chute plate, as above noted, when the crank bar or shaft is turned by the movement of the crank in the direction indicated by the arrow in Figure 1 said loop raises the free end of the chute plate until it bears against the transverse rod and locks the same in position to prevent the outward swinging movement of the gate leaves. A stop 26 is arranged in the path of swinging movement of the crank arm.

The lower edges of the gate leaves are provided with outwardly directed ears 27 and the side edges of the chute plate are provided with flanges turned inwardly to form grooves for the reception of said ears so that with the chute plate in its horizontal or extended position and the gate leaves swung outwardly or rearwardly in rearwardly convergent relations corresponding with the side edges of the chute plate, the ears at the lower edges of said leaves engage the grooves in the side edges of the chute plate and assist in supporting the latter while providing an interlocking joint between the leaves and the plate and a rearwardly reduced means for guiding the contents of the body to the outlet. The front or lateral edges of the leaves occupy positions flush with the inner surfaces of the side walls of the body.

Pivotally mounted as at 28 upon the reduced rear end of the chute plate is a spout or hood 29 provided at its forward end with side flanges 30 against which the rear free ends of the gate leaves bear, and the downward swinging movement of said spout is limited by a chain 32 extending to the cross rod 15.

With the parts in the discharging position indicated in Figure 3 it is obvious that the tilting of the body of the wagon will cause the contents thereof to pass through the chute and spout so as to be delivered into any suitable means such as a trough or conveyor leading to the desired point of deposit of the material whether coal, grain or any equivalent thereof, or insuring the deposit of dirt or soil in a car or like vehicle when the device is employed in connection with excavating and like operations; and when the wagon is being filled or is in transit the gate leaves are adapted to be folded into parallel relation and the crank shaft thrown forward until it locks the chute plate in position to prevent displacement of said leaves while the spout drops in rear of the chute plate and occupies a position which does not in any way interfere with the loading of the body.

Having described the invention, what is claimed as new and useful is:—

1. A dump wagon having gate leaves pivotally mounted in the sides of the body for rearward swinging movement, a chute plate hinged in the plane of the bottom of the body for disposition in horizontal extension thereof, means for locking the chute plate in an upright position in the path of rearward swinging movement of said gate leaves, and a spout pivotally mounted on the chute plate and provided with means for disposing it in alignment with the space defined by the leaves when arranged in operative relation with the chute plate.

2. A dump wagon body having gate leaves pivotally mounted at the sides of the body for rearward swinging movement, a chute plate hinged in the plane of the bottom of the body for arrangement in horizontal extension thereof, and means for locking the chute plate in an upright position in the path of rearward swinging movement of said gate leaves, and consisting of a crank shaft having a crank disposed in pendent supporting relation with the chute plate when the latter is in its horizontal or extended position.

3. A dump wagon body having gate leaves pivotally mounted at the sides of the body for rearward swinging movement, a chute plate hinged in the plane of the bottom of the body for arrangement in horizontal extension thereof, and means for locking the chute plate in an upright position in the path of rearward swinging movement of said gate leaves, and consisting of a crank shaft having a crank disposed in pendent supporting relation with the chute plate when the latter is in its horizontal or extended position, means being provided for limiting the movement of the crank shaft.

4. A dump wagon body having gate leaves pivotally mounted at the sides of the body for rearward swinging movement, a chute plate hinged in the plane of the bottom of the body for arrangement in horizontal extension thereof, and means for locking the chute plate in an upright position in the path of rearward swing movement of said gate leaves, a spout being carried by the rear edge of the chute plates for alignment with the space defined by the gate leaves when arrange in operative relation with the chute plate.

5. A dump wagon body having gate leaves pivotally mounted at the sides of the body for rearward swinging movement, a chute plate hinged in the plane of the bottom of the body for arrangement in horizontal extension thereof, and means for locking the chute plate in an upright position in the path of rearward swinging movement of said gate leaves, a spout being carried by the rear edge of the chute plates for alignment with the space defined by the gate leaves when arranged in operative relation with the shute plate and having flanges for engagement by the rear end edges of said gate leaves.

In testimony whereof he affixes his signature.

ROBERT T. DAILEY.